United States Patent
Ashrafi et al.

(10) Patent No.: US 10,994,722 B2
(45) Date of Patent: May 4, 2021

(54) TECHNIQUES FOR MONITORING POWERTRAIN PROPULSIVE TORQUE IN BATTERY ELECTRIC AND PLUG-IN HYBRID ELECTRIC VEHICLES

(71) Applicants: Behrouz Ashrafi, Northville, MI (US); Sathya Manivasagam, Bloomfield Hills, MI (US); Feisel F Weslati, Troy, MI (US); Timothy A Coatesworth, Bloomfield, MI (US)

(72) Inventors: Behrouz Ashrafi, Northville, MI (US); Sathya Manivasagam, Bloomfield Hills, MI (US); Feisel F Weslati, Troy, MI (US); Timothy A Coatesworth, Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 241 days.

(21) Appl. No.: 16/364,923

(22) Filed: Mar. 26, 2019

(65) Prior Publication Data

US 2019/0315341 A1 Oct. 17, 2019

Related U.S. Application Data

(60) Provisional application No. 62/658,044, filed on Apr. 16, 2018.

(51) Int. Cl.
| | | |
|---|---|---|
| *B60W 10/08* | (2006.01) | |
| *B60W 20/00* | (2016.01) | |
| *B60W 20/50* | (2016.01) | |
| *B60L 15/20* | (2006.01) | |
| *F16H 3/72* | (2006.01) | |
| *B60W 10/02* | (2006.01) | |

(52) U.S. Cl.
CPC ............ *B60W 20/50* (2013.01); *B60W 10/02* (2013.01); *B60W 10/08* (2013.01); *B60W 2510/083* (2013.01); *B60W 2710/083* (2013.01)

(58) Field of Classification Search
CPC ...... B60W 20/50; B60W 20/00; B60W 10/08; B60K 17/16; B60L 15/20
See application file for complete search history.

(56) References Cited

U.S. PATENT DOCUMENTS

| | | | |
|---|---|---|---|
| 6,409,623 B1 * | 6/2002 | Hoshiya | B60W 10/08 475/5 |
| 7,313,470 B2 | 12/2007 | Zaremba et al. | |
| 8,775,046 B2 | 7/2014 | Kaster et al. | |
| 9,090,245 B2 | 7/2015 | Livshiz et al. | |
| 9,126,592 B2 | 9/2015 | Park et al. | |
| 2005/0246081 A1 | 11/2005 | Bonnet et al. | |
| 2009/0305842 A1 | 12/2009 | Seel et al. | |

(Continued)

*Primary Examiner* — Yuri Kan
(74) *Attorney, Agent, or Firm* — Ralph E. Smith

(57) ABSTRACT

Systems and methods for monitoring electrified vehicle powertrain propulsive torque and taking remedial action when needed involve continuously monitoring an error between the actual and requested propulsive torques and comparing the error to various threshold values. Error exceeding a particular threshold could be indicative of a malfunction, and the vehicle could be afforded an opportunity to regain equilibrium by temporarily decreasing torque output. When the error continues to exceed the threshold or another threshold, however, further remedial action could be required, such as shutting down the vehicle.

18 Claims, 5 Drawing Sheets

(56) References Cited

U.S. PATENT DOCUMENTS

| | | |
|---|---|---|
| 2012/0059539 A1 | 3/2012 | Arnett et al. |
| 2012/0290187 A1 | 11/2012 | Oesterreicher et al. |
| 2015/0151634 A1* | 6/2015 | Smetana ................ F16H 48/11 475/150 |
| 2015/0151736 A1* | 6/2015 | Kim ..................... B60W 10/08 701/22 |
| 2019/0291591 A1* | 9/2019 | Suzuki ................... B60L 15/20 |

* cited by examiner

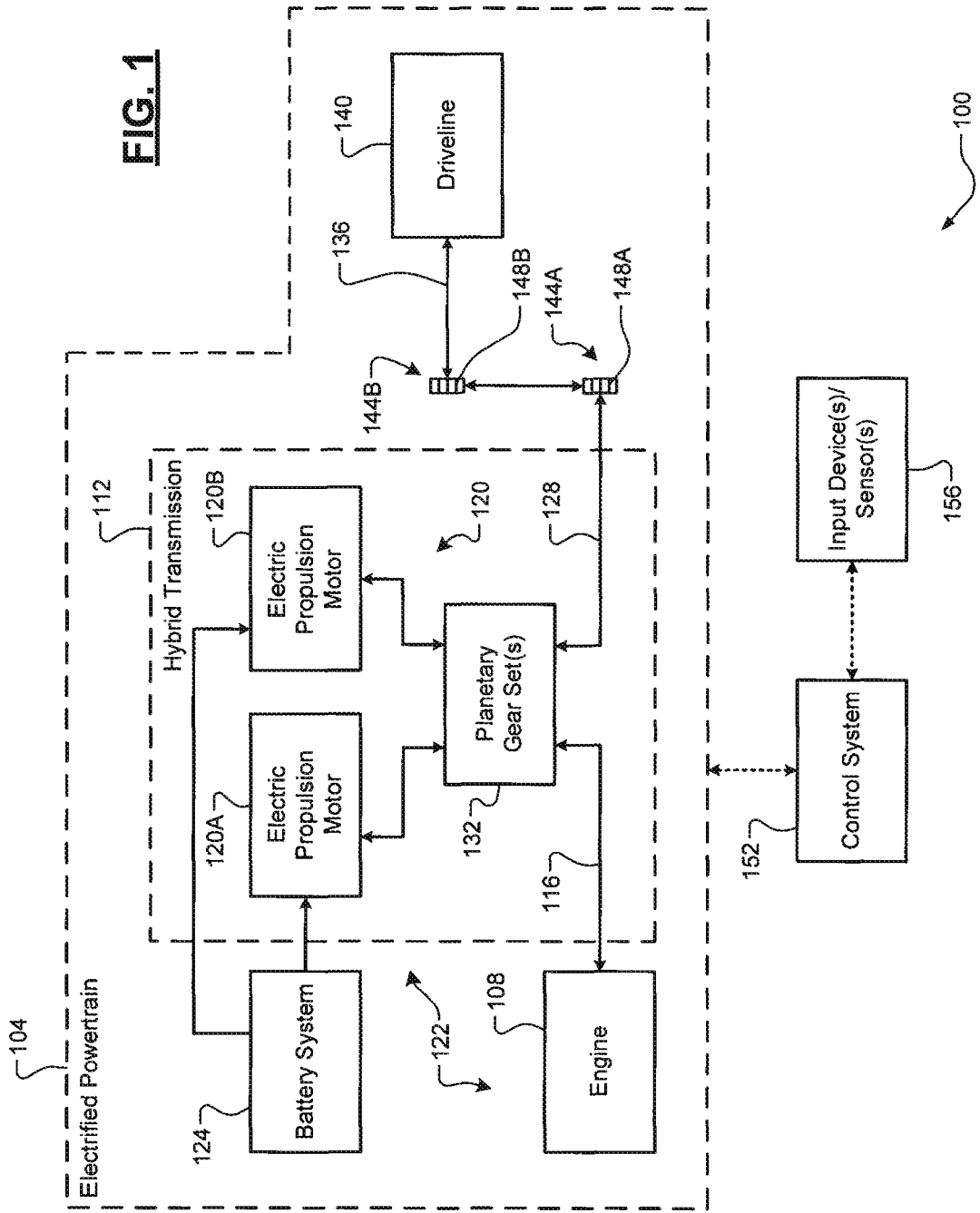

TECHNIQUES FOR MONITORING POWERTRAIN PROPULSIVE TORQUE IN BATTERY ELECTRIC AND PLUG-IN HYBRID ELECTRIC VEHICLES

CROSS-REFERENCE TO RELATED APPLICATIONS

This application claims the benefit of U.S. Provisional Application No. 62/658,044, filed on Apr. 16, 2018. The disclosure of the above application is incorporated herein by reference in its entirety.

FIELD

The present application generally relates to electrified vehicle torque control and, more particularly, to systems and methods for monitoring electrified vehicle powertrain propulsive torque and taking remedial action when needed.

BACKGROUND

A powertrain of a hybrid or electrified vehicle (EV) (a battery electric vehicle (BEV), a plug-in hybrid electric vehicle (PHEV), etc.) typically includes an internal combustion engine and/or one or more electric motors that collectively generate and output a desired drive torque to propel the EV. In some cases, the EV powertrain could unintentionally or accidentally generate and output propulsive torque, which could be an undesirable operating scenario. This could occur, for example, when a potential fault or malfunction occurs at a controller, microprocessor, or software that is handling the EV powertrain torque control functionality. Non-limiting examples of these possible faults include memory corruption and software errors. Accordingly, while such EV powertrain control systems do work well for their intended purpose, there remains a need for improvement in the relevant art.

SUMMARY

According to one example aspect of the invention, a powertrain propulsive torque monitoring and remedial action system for an electrified vehicle having an electrified powertrain including an engine and a hybrid transmission comprising at least one electric propulsion motor is presented. In one exemplary implementation, the system comprises: a set of input devices/sensors configured to receive a set of inputs indicative of a driver torque request and a control system comprising a main control system, a first monitoring system, and a second monitoring system that are distinct from each other, wherein: the main control system is configured to (i) determine a first distribution of the driver torque request to the electrified powertrain and (ii) take first remedial action when commanded by the first monitoring system, the first remedial action involving reducing a torque output of the electrified powertrain for a period and the electrified powertrain remaining operational, the first monitoring system is configured to (i) determine a second distribution of the driver torque request to electrified powertrain, (ii) determine an error indicative of a difference between the first and second distributions, and (iii) command the main control system to take the first remedial action based on the error and a set of thresholds, and the second monitoring system is configured to (i) detect unintended propulsive torque being generated by the electrified powertrain after the first remedial action has been taken and (ii) in response, take a second remedial action by disabling the electrified powertrain.

In some implementations, the first remedial action is a reduced performance limp-home mode for at least a remainder of a current key-cycle. In some implementations, the first monitoring system is configured to command the main control system to take the first remedial action when the error exceeds a first threshold of the set of thresholds. In some implementations, the first monitoring system is further configured to determine a rate of change of the error over a period and command the main control system to take the first remedial action when the rate of change of the error over the period exceeds a second threshold of the set of thresholds.

In some implementations, disabling the electrified powertrain comprises setting all torque requests to zero. In some implementations, the second remedial action further comprises setting a diagnostic trouble code (DTC). In some implementations, the main control system and the first and second monitoring systems are distinct portions of a single processor. In some implementations, the main control system and the first and second monitoring systems are separate cores of the single processor. In some implementations, the main control system and the first and second monitoring systems are distributed amongst two or more distinct processors.

According to another example aspect of the invention, an electrified vehicle is presented. In one exemplary implementation, the vehicle comprises: an electrified powertrain comprising an engine and a hybrid transmission comprising two electric propulsion motors, wherein the engine and the hybrid transmission of the electrified powertrain operate collectively or independently to generate and output a drive torque to a driveline of the vehicle, a set of input devices/sensors configured to receive a set of inputs indicative of a driver torque request to be generated and output by the electrified powertrain, and a control system comprising a main control, a first monitoring system, and a second monitoring system that are distinct from each other, wherein: the main control system is configured to (i) determine a first distribution of the driver torque request to the electrified powertrain and (ii) take first remedial action when commanded by the first monitoring system, the first remedial action involving reducing a torque output of the electrified powertrain for a period and the electrified powertrain remaining operational, the first monitoring system is configured to (i) determine a second distribution of the driver torque request to electrified powertrain, (ii) determine an error indicative of a difference between the first and second distributions, and (iii) command the main control system to take the first remedial action based on the error and a set of thresholds, and the second monitoring system is configured to (i) detect unintended propulsive torque being generated by the electrified powertrain after the first remedial action has been taken and (ii) in response, take a second remedial action by disabling the electrified powertrain.

In some implementations, the first remedial action is a reduced performance limp-home mode for at least a remainder of a current key-cycle. In some implementations, the first monitoring system is configured to command the main control system to take the first remedial action when the error exceeds a first threshold of the set of thresholds. In some implementations, the first monitoring system is further configured to determine a rate of change of the error over a period and command the main control system to take the first remedial action when the rate of change of the error over the period exceeds a second threshold of the set of thresholds.

In some implementations, disabling the electrified powertrain comprises setting all torque requests to zero. In some implementations, the second remedial action further comprises setting a DTC. In some implementations, the main control system and the first and second monitoring systems are distinct portions of a single processor. In some implementations, the main control system and the first and second monitoring systems are separate cores of the single processor. In some implementations, the main control system and the first and second monitoring systems are distributed amongst two or more distinct processors.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a functional block diagram of an example electrified vehicle according to the principles of the present disclosure;

DETAILED DESCRIPTION

Figure 2A:
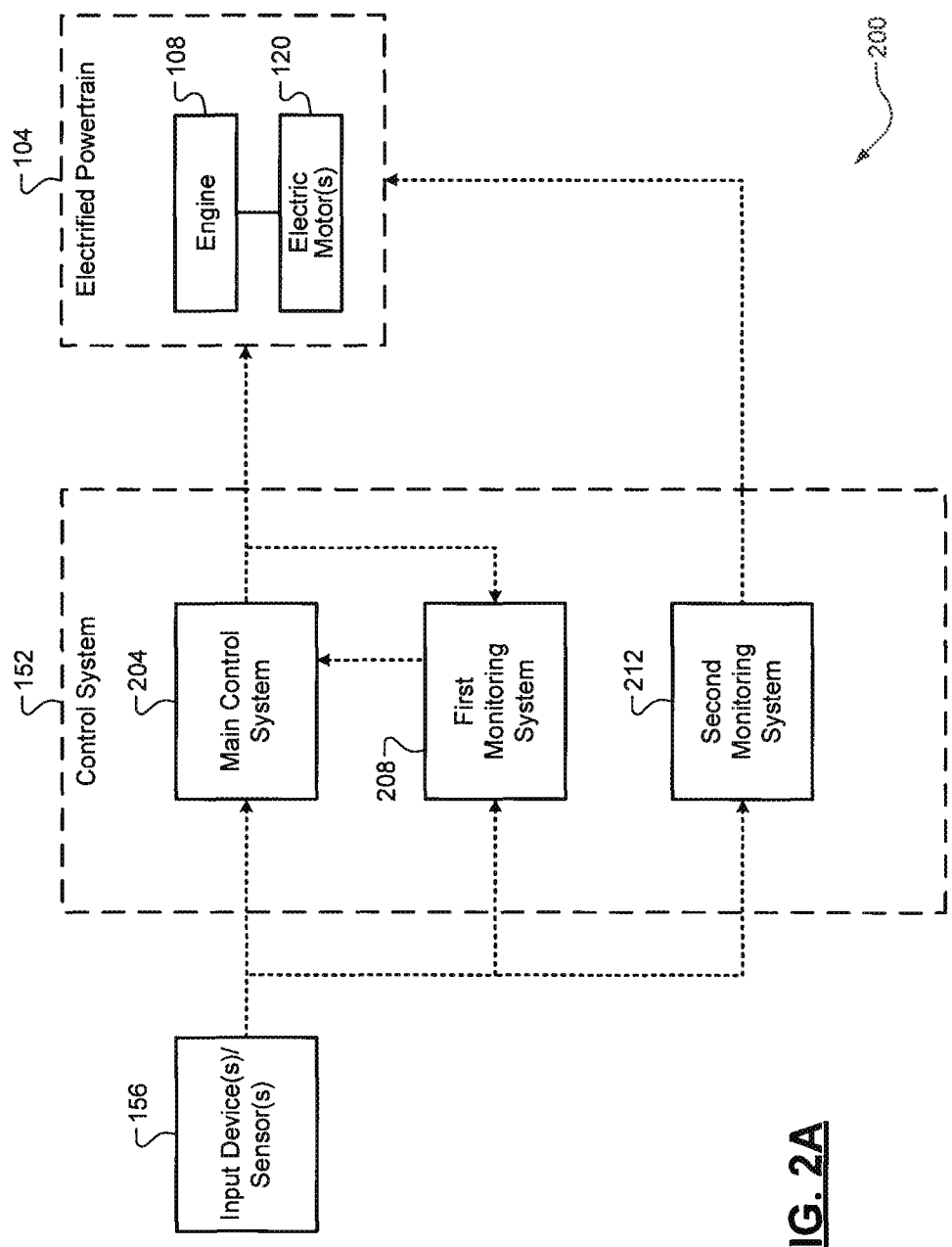
FIGS. 2A-2B are functional block diagrams of a control system of the electrified vehicle according to the principles of the present disclosure.

As discussed above, an electrified vehicle (EV) powertrain could potentially generate and output unintended propulsive torque, which is an undesirable scenario. Accordingly, improved techniques for monitoring EV powertrain propulsive torque and taking remedial action when needed are presented. These techniques involve continuously monitoring a difference (error) between the actual and requested (e.g., accelerator pedal based) propulsive torques. The differences (error) between the actual and commanded propulsive torques for various torque actuators are compared to various threshold values. Error exceeding a particular threshold could be indicative of a malfunction, and the system could be afforded an opportunity to regain equilibrium by temporarily decreasing torque output. However, if the error continues to exceed the threshold or another threshold, further remedial action could be required. For example, the EV powertrain control system could shut down the EV (e.g., command all torques to zero). This remedial action, however, should be considered a last resort. For example, completely shutting down the EV could leave the driver stranded.

Referring now to FIG. 1, a functional block diagram of an example hybrid or electrified vehicle 100 is illustrated. Non-limiting examples of the vehicle 100 include a battery electric vehicle (BEV) and a plug-in hybrid electric vehicle (PHEV). The vehicle 100 includes a hybrid or electrified powertrain 104 comprising an engine 108 and a hybrid transmission 112. The engine 108 is configured to combust an air/fuel mixture within cylinders to generate drive torque at a crankshaft 116, which is coupled to one of a plurality of planetary gear sets 132 of the transmission 112. In one exemplary implementation, the transmission 112 comprises two electric propulsion motors 120A and 120B (collectively, "electric propulsion motors 120" or "electric motors 120") that are each powered by a battery system 124 and configured to generate torque that is transmitted to an output shaft 128 of the transmission 112 ("transmission output shaft 128") via one or more of the planetary gear sets 132. The engine 108 and the electric motors 120 are also referred to collectively herein as "torque generating system 122."

As described herein and shown in FIG. 1, the transmission 112 could also be referred to as a continuously variable transmission (CUT) or an electrically variable transmission (EVT). In one exemplary implementation, the crankshaft 116 is coupled to a first planetary gear set 132, which is in turn connected to one of the electric motors 120. In this exemplary implementation, the other electric motor 120 is connected to one or more other planetary gear sets 132, and one or more of the planetary gear sets 132 is coupled to the transmission output shaft 128. While two electric motors 120 are illustrated herein, it will be appreciated that the vehicle 100 could include any combination of one or more electric motors that are configured to generate propulsive torque. Because the electric motors 120 are configured to generate drive torque at the transmission output shaft 128, the engine 108 could be configured to have a lower cylinder compression ratio, thereby increasing fuel economy. That is, the electric motors 120 are able to compensate for the decreased power density of (and thus a lack of drive torque produced by) such a lower-compression engine, particularly at low loads/speeds.

In one exemplary implementation, the engine 108 is an Atkinson-cycle engine comprising six cylinders and having a compression ratio of approximately 12.5:1. The transmission output shaft 128 is directly coupled to a shaft 136 of a driveline 140 ("driveline shaft 140") of the powertrain 104. In one exemplary implementation, there is no disconnect or decoupling clutch disposed therebetween. Gears 144A and 144B having teeth 148A and 148B are coupled to the transmission output and driveline shafts 128, 132, respectively, and interact to transfer torque therebetween. A control system 152 comprises one or more controllers or processors and is configured to monitor and control operation of the powertrain 104, including possible remedial action when unintended powertrain propulsive torque occurs. The control system 152 receives input parameters from a set of vehicle sensors and/or input devices 156, such as, but not limited to, an accelerator pedal and a vehicle speed sensor. A driver input via the accelerator pedal, for example, is indicative of a desired drive torque to be achieved by the powertrain 104, whereas a measurement by the vehicle speed sensor is indicative of whether the vehicle 100 is moving or not.

Referring now to FIG. 2A, a functional block diagram of an example configuration 200 of the control system 152 is illustrated. The control system 152 comprises a main control system 204, a first monitoring system 208, and a second monitoring system 212. The main control system 204 and the first and second monitoring systems 208, 212 are also referred to herein as a main control system portion 204 and first and second monitoring system portions 208, 212 because they could be distinct portions of a same processing device. For example, these systems 204, 208, 212 could be implemented on distinct portions of a single processing unit, such as two or more cores of a multiple core central processing unit. Alternatively, for example, these systems 204, 208, 212 could be implemented on distinct processing units, i.e., two or more distinct processors. The primary reason that these systems 204, 208, 212 are separated is to provide added redundancy in the event that the main control system 204 fails, such as due to processing or computational error or memory corruption. This is particularly true for the powertrain configuration illustrated in FIG. 1 and discussed above because the transmission 112 comprises at least one electric propulsion motor.

The main control system 204 receives input parameters from input devices/sensors 164, such as, but not limited to, accelerator pedal position and vehicle speed. These input parameters are also provided to the first and second monitoring systems 208, 212. The main control system 204 determines a torque split or distribution amongst the engine 108 and the one or more electric motors 120. In other words, the main control system 204 commands each of these actuators such that they independently or collectively achieve the driver's torque request. This commanded torque distribution is also provided to the first monitoring system, which compares these values to the actual torques being achieved by the torque actuators. When the difference or error between the commanded and actual values exceeds a particular threshold value, the first monitoring system 208 commands the main control system 204 to take a first remedial action. This first remedial action allows the vehicle 100 to continue operating. For example, the first remedial action could be commanding a decrease to the driver's torque request in an effort to allow the system to regain equilibrium.

In one exemplary implementation, the first monitoring system 208 calculates a rate of change of the error. When the rate of change of the error exceeds a particular threshold value, the first monitoring system 208 could command the main control system 204 to take the first remedial action. For example, even though the error may not exceed a particular threshold value, its rate of change may exceed another threshold value that is indicative of the first remedial action being needed. The second monitoring system 212 also calculates a difference (error) between the actual and commanded torque values similar to the first monitoring system 208. When the error or a rate of change of the error exceeds respective thresholds, the second monitoring system 212 takes a further second remedial action. The thresholds used by the second monitoring system 212 could be the same or different (e.g., greater) than the thresholds used by the first monitoring system 208 as they correspond to a more severe second remedial action. This second remedial action could be, for example, commanding a limp-home (torque limited) mode for at least a remainder of a current key-cycle of the vehicle 100 or completely disabling the electrified powertrain 104 (e.g., commanding all torque requests to zero). In some cases, the second remedial action could also include setting a diagnostic trouble code (DTC).

Figure 2B:
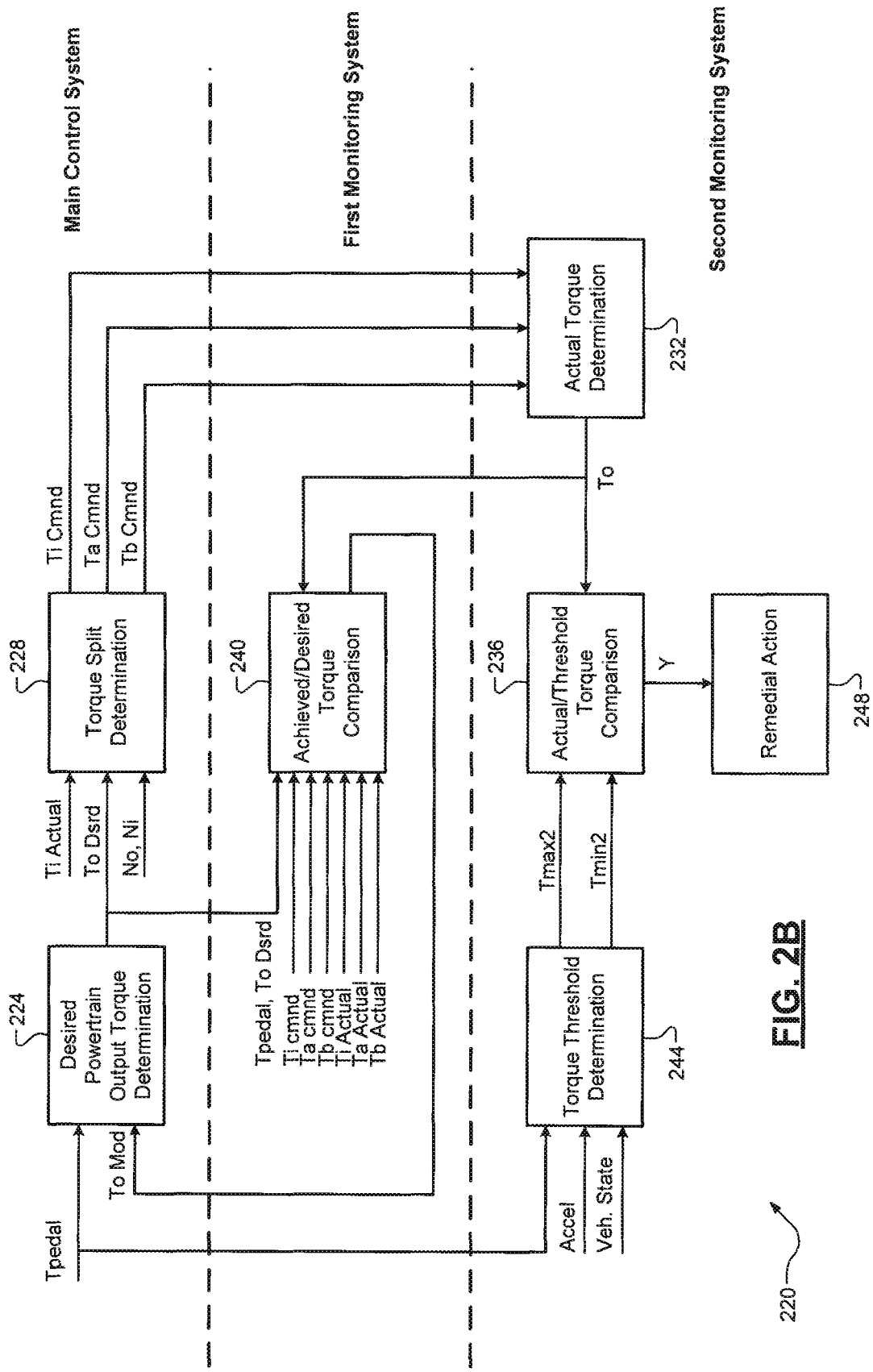
Figure 2C:
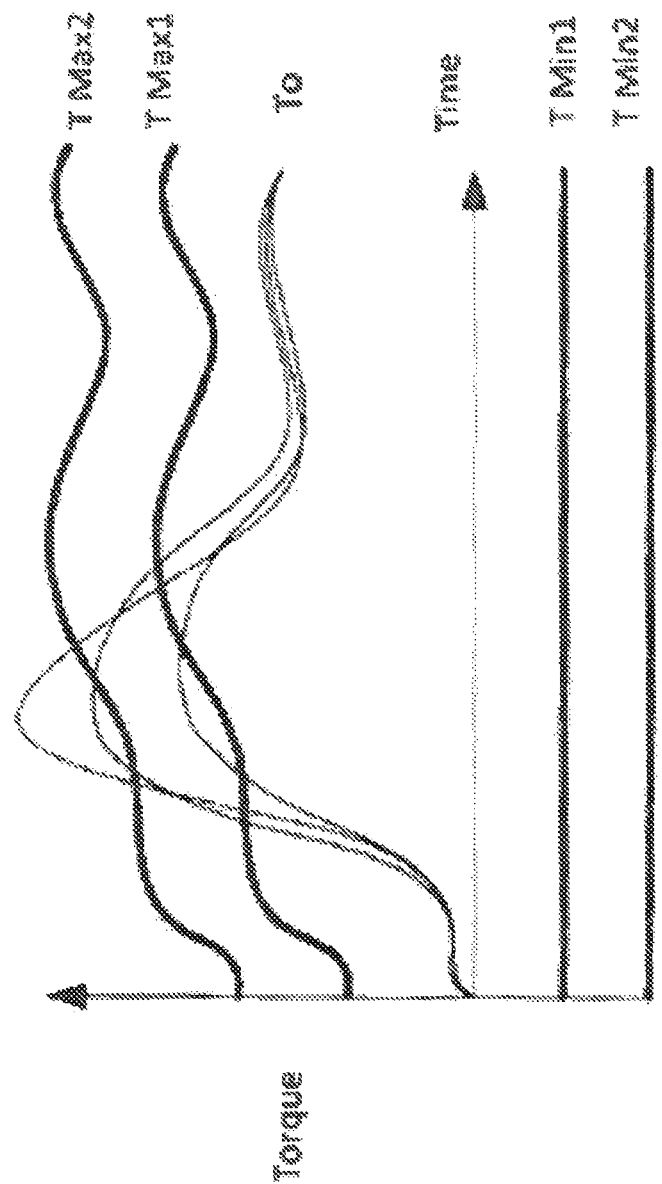
FIG. 2C is a plot of example remedial action taken by the control system according to the principles of the present disclosure.

Referring now to FIGS. 2B-2C, one exemplary configuration of the main control system 204 and the first and second monitoring systems 208, 212 and a plot of example remedial action are illustrated. The main control system 204 comprises a desired powertrain output torque determination block 224 and a torque split or distribution block 228. Block 224 receives a driver torque request (Tpedal) in response to accelerator pedal input and an optional torque modifier (To Mod) from the first monitoring system 208. Block 224 determines a total desired output torque (To Dsrd) for the electrified powertrain 104. Block 228 receives this total desired output torque, the actual engine output torque (Ti Actual), and motor parameters No, Ni. Based on these parameters, block 228 determines a torque split or distribution amongst the engine (Ti Cmnd) and the electric propulsion motors (Ta Cmnd, Tb Cmnd). These values are all fed to an actual torque determination block 232 of the second monitoring system 212, which determines the actual torque (To) being achieved by the electrified powertrain 104. The actual torque is fed to an actual/threshold torque comparison block 236 of the second monitoring system 212, as well as an achieved/desired torque comparison block 240 of the first monitoring system 208. Block 240 of the first monitoring system compares the actual torque to one or more first thresholds (e.g., Tmin1 and Tmax1).

These torque limits could be predetermined or calculated by the first monitoring system 208. When one of these thresholds is crossed, the first monitoring system 208 instructs the main control system 204 to modify the commanded actuator torques or sends a correction value (Tmod) to the main control system. Block 236 of the second monitoring system 212 also compares the total torque To to one or more second thresholds (e.g., Tmin2 and Tmax2). These limits are calculated by torque threshold determination block 244 of the second monitoring system 212 based on an acceleration metric, a state of the vehicle, and the driver's torque request Tpedal and could be similar to or different than (e.g., larger or more severe than) the other torque limits (Tmax1, Tmin1) that are utilized by the first monitoring system 208. If the acceptable torque value of To keeps growing such that it passes one of these torque limits (Tmax2, Tmin2), as depicted in the plot of FIG. 2C, the second monitoring system determines that a critical malfunction or fault has occurred within the main control system 204 and therefore takes a more severe remedial action, such as commanding the limp-home mode or fully shutting down the vehicle 100 (e.g., by setting all torque requests to zero).

Figure 3:
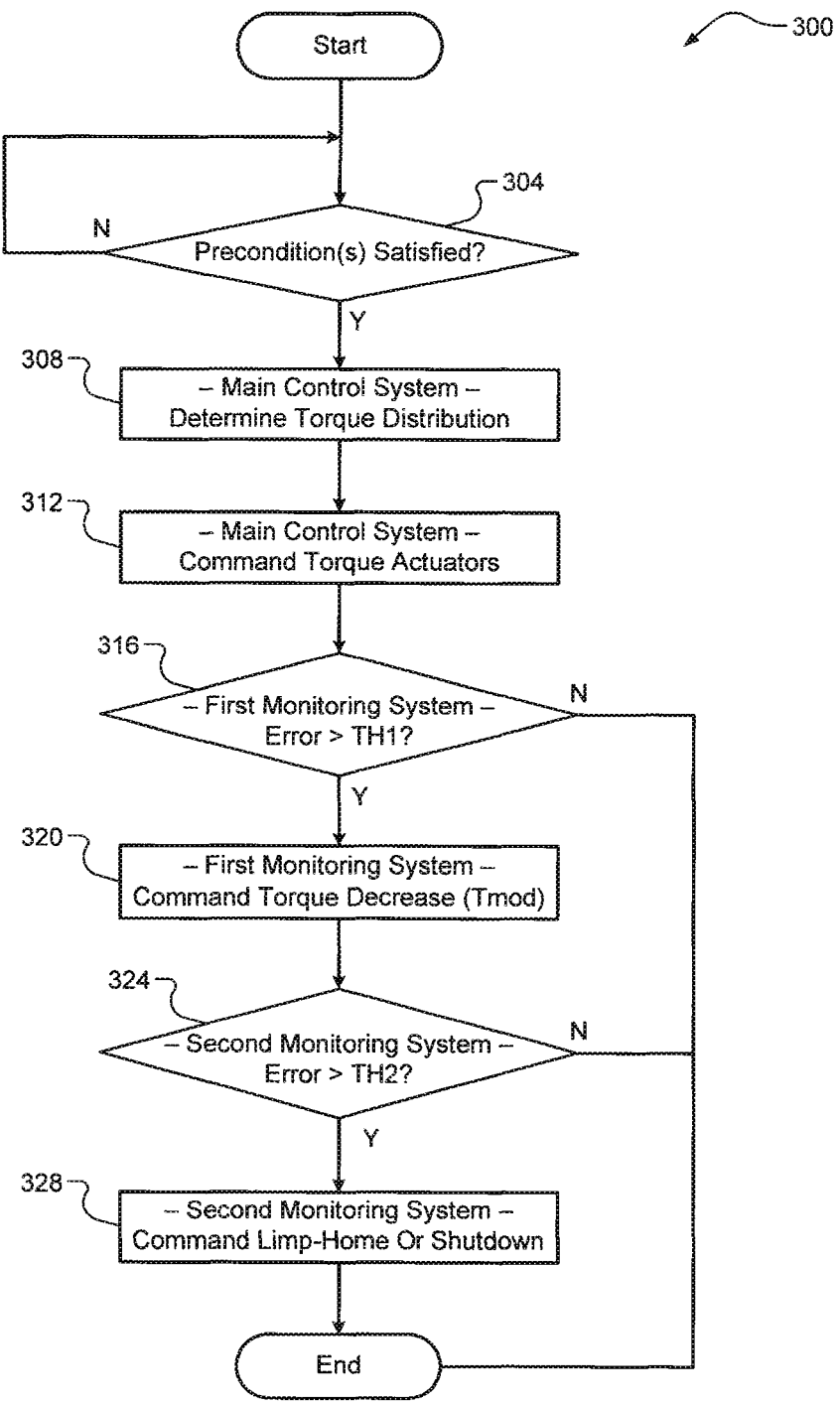
FIG. 3 is a flow diagram of an example method of monitoring electrified vehicle powertrain propulsive torque and taking remedial action when needed according to the principles of the present disclosure.

Referring now to FIG. 3, a flow diagram of an example method 300 of monitoring electrified vehicle powertrain propulsive torque and taking remedial action when needed is illustrated. At 304, the control system 152 optionally determines whether one or more preconditions are satisfied. This could include, for example, determining whether there are any existing malfunctions that would preclude vehicle operation, such as the DTC described above having previously been set. When the one or more optional preconditions are satisfied, the method 300 proceeds to 308 where the main control system 204 determines the torque split or distribution (e.g., based on accelerator pedal input) and then commands the torque actuators accordingly at 312. At 316, the first monitoring system 208 determines whether the difference (error) between the actual and commanded torques is outside of one or more first thresholds (e.g., Tmin1 and Tmax1). When true, the method 300 proceeds to 320. Otherwise, the method 300 ends or returns to 304 or 308. At 320, the first monitoring system 208 commands the main control system 204 to decrease or limit its torque output (e.g., a modifier Tmod to the accelerator pedal torque request Tpedal). At 324, the second monitoring system 212 determines whether the difference (error) between the actual and commanded torques, after the first remedial action of decreasing or limiting torque output, are outside of one or more second thresholds (e.g., Tmin2 and Tmax2). When true, the method 300 proceeds to 328. Otherwise, the method 300 ends or returns to 304 or 308. At 328, the second monitoring system 212 takes further second remedial action, such as commanding the limp-home mode for at least the remainder of the current key-cycle of the vehicle 100 or completely disabling the electrified powertrain (e.g., by setting all torque requests to zero).

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A powertrain propulsive torque monitoring and remedial action system for an electrified vehicle having an electrified powertrain including an engine and a hybrid transmission comprising at least one electric propulsion motor, the system comprising:
    a set of input devices/sensors configured to receive a set of inputs indicative of a driver torque request; and
    a control system comprising a main control system, a first monitoring system, and a second monitoring system that are distinct from each other, wherein:
    the main control system is configured to (i) determine a first distribution of the driver torque request between the engine and the at least one electric propulsion motor of the hybrid transmission of the electrified powertrain and (ii) take first remedial action when commanded by the first monitoring system, the first remedial action involving reducing a torque output of the electrified powertrain for a period and the electrified powertrain remaining operational;
    the first monitoring system is configured to (i) determine a second distribution of the driver torque request between the engine and the at least one electric propulsion motor of the hybrid transmission of the electrified powertrain, (ii) determine an error indicative of a difference between the first and second distributions, and (iii) command the main control system to take the first remedial action based on the error and a set of thresholds; and
    the second monitoring system is configured to (i) detect unintended propulsive torque being generated by the electrified powertrain after the first remedial action has been taken and (ii) in response, take a second remedial action by disabling the electrified powertrain.

2. The system of claim 1, wherein the first remedial action is a reduced performance limp-home mode for at least a remainder of a current key-cycle.

3. The system of claim 1, wherein the first monitoring system is configured to command the main control system to take the first remedial action when the error exceeds a first threshold of the set of thresholds.

4. The system of claim 3, wherein the first monitoring system is further configured to determine a rate of change of the error over a period and command the main control system to take the first remedial action when the rate of change of the error over the period exceeds a second threshold of the set of thresholds.

5. The system of claim 1, wherein disabling the electrified powertrain comprises setting all torque requests to zero.

6. The system of claim 1, wherein the second remedial action further comprises setting a diagnostic trouble code (DTC).

7. The system of claim 1, wherein the main control system and the first and second monitoring systems are distinct portions of a single processor.

8. The system of claim 7, wherein the main control system and the first and second monitoring systems are separate cores of the single processor.

9. The system of claim 1, wherein the main control system and the first and second monitoring systems are distributed amongst two or more distinct processors.

10. An electrified vehicle, comprising:
    an electrified powertrain comprising:
    an engine; and
    a hybrid transmission comprising two electric propulsion motors,
    wherein the engine and the hybrid transmission operate collectively or independently to generate and output a drive torque to a driveline of the vehicle;
    a set of input devices/sensors configured to receive a set of inputs indicative of a driver torque request to be generated and output by the electrified powertrain; and
    a control system comprising a main control system, a first monitoring system, and a second monitoring system that are distinct from each other, wherein:
    the main control system is configured to (i) determine a first distribution of the driver torque request between the engine and the two electric propulsion motors of the hybrid transmission of the electrified powertrain and (ii) take first remedial action when commanded by the first monitoring system, the first remedial action involving reducing a torque output of the electrified powertrain for a period and the electrified powertrain remaining operational;
    the first monitoring system is configured to (i) determine a second distribution of the driver torque request between the engine and the two electric propulsion motors of the hybrid transmission of the electrified powertrain, (ii) determine an error indicative of a difference between the first and second distributions, and (iii) command the main control system to take the first remedial action based on the error and a set of thresholds; and
    the second monitoring system is configured to (i) detect unintended propulsive torque being generated by the electrified powertrain after the first remedial action has been taken and (ii) in response, take a second remedial action by disabling the electrified powertrain. remedial action has been taken and (ii) in response, take a second remedial action by disabling the electrified powertrain.

11. The vehicle of claim 10, wherein the first remedial action is a reduced performance limp-home mode for at least a remainder of a current key-cycle.

12. The vehicle of claim 10, wherein the first monitoring system is configured to command the main control system to take the first remedial action when the error exceeds a first threshold of the set of thresholds.

13. The vehicle of claim 12, wherein the first monitoring system is further configured to determine a rate of change of the error over a period and command the main control system to take the first remedial action when the rate of change of the error over the period exceeds a second threshold of the set of thresholds.

14. The vehicle of claim 10, wherein disabling the electrified powertrain comprises setting all torque requests to zero.

15. The vehicle of claim 14, wherein the second remedial action further comprises setting a diagnostic trouble code (DTC).

16. The vehicle of claim 10, wherein the main control system and the first and second monitoring systems are distinct portions of a single processor.

17. The vehicle of claim 16, wherein the main control system and the first and second monitoring systems are separate cores of the single processor.

18. The vehicle of claim 10, wherein the main control system and the first and second monitoring systems are distributed amongst two or more distinct processors.

\* \* \* \* \*